Patented Dec. 4, 1945

2,390,476

UNITED STATES PATENT OFFICE 2,390,476

SULPHOALIPHATIC GUANAMINES

Jack Theo Thurston, Cos Cob, Conn., assignor to American Cyanamid Company, New York, N. Y., a corporation of Maine No Drawing. Application August 30, 1941, Serial No. 409,145

5 Claims. (Cl. 260—249.5)

This invention relates to sulphoaliphatic guanamines in which the sulpho group is attached to a carbon atom of the aliphatic group that is not connected to the triazine ring. They may be represented by the following formula: R—CH$_2$—G in which R is a sulphonated aliphatic radical and G is a guanamine having a free valence on the 2-carbon atom of the triazine ring. Some guanamines are known including those with a short alkyl chain on the 2-carbon atom of the triazine ring. These guanaminea are capable of reacting with formaldehyde to form resins which are for the most part thermosetting. The resins are, however, often insoluble in aqueous media which limits their field of utility as they are not suitable for aqueous textile finishes. I have found, however, that when sulphoaliphatic substituted guanamines are prepared in which the sulphonic group is attached to the beta- or further removed carbon atom from the triazine ring, they form resins that are water-soluble or water-dispersible in the form of their alkali metal salts and can be effectively used as textile finishes.

Another field of utility of the guanamines of the present invention lies in the preparation of wetting agents which are obtained when the radical R contains a satisfactory balance of hydrophobe and hydrophile groups.

A further useful field of the guanamines of the present invention is in the synthetic tanning industry as many of these compounds are satisfactory syntans and when used after reaction with formaldehyde can also impart other desirable characteristics to leathers by reason of the presence of the synthetic resin.

The present invention is not limited to any particular method of making the sulphoaliphatic guanamines but I have found that a very effective method is the reaction of a biguanide with an ester of the corresponding sulphoaliphatic carboxylic acid, and in a more specific modification of the invention this process is claimed.

It is an advantage that with the important guanamines of the present invention the preferred process can be used without any strongly basic condensing agents such as a metal alkoxide. However, in some instances, notably with N-substituted biguanides, it may be desired to accelerate the course of the reaction by the use of such condensing agents.

The most important members of the present invention are prepared by reacting biguanide itself with the corresponding ester. This procedure produces guanamines in which the triazine ring contains two unsubstituted amino groups in the 4 and 6 positions. However, the invention is not limited to such products and on the contrary, the N-substituted guanamines can be prepared by using suitably substituted biguanides such as phenyl biguanide, allyl biguanide and dimethylbiguanide.

In general the preferred process of the present invention operates best in the presence of a suitable solvent for the biguanide and/or the ester. I have found that the lower molecular weight alcohols are particularly effective as they are good solvents for biguanide. The cheap monohydric paraffin alcohols such as methanol and ethanol operate well and are of particular advantage because the most readily available esters of the carboxylic acids are usually the methyl and ethyl esters, and if an alcohol is used as a solvent corresponding to the alcohol radical of the ester, no separation problem arises. Excellent results are, however, obtained with phenolic esters and the other lower monohydric alcohols such as the ether alcohols, for example, the ethyl ether of ethylene glycol.

The sulphoaliphatic guanamines of the present invention are capable of forming salts in which case the hydrogen of the sulpho radical is replaced by a metal such as alkali or alkaline earth metals. Salts with organic bases may also be prepared by reacting the sulphoaliphatic guanamines with compounds such as ammonia, amines, amidines, and the like.

The invention will be described in greater detail in conjunction with the following specific examples which are typical illustrations. The parts are by weight.

*Example 1*

β-sulphopropionoguanamine

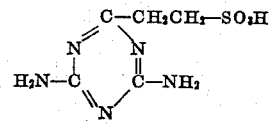

To 36 parts of anhydro-β-sulphopropionic acid previously dissolved in 160 parts of hot methanol, was added 55 parts of biguanide. The solution became very warm and in about one-half hour crystallization began to take place. After standing for several hours, the biguanide salt of β-sulfopropionoguanamine was removed by filtration and dried over sulphuric acid. The yield of this crude salt melting at 229–231° C. was 82%. The free acid decomposing at 255–260° C. without melting was obtained by acidification of an aqueous solution of the biguanide salt and was purified by recrystallization from hot water.

Example 2

β-sulpho-β-carboxypropionoguanamine

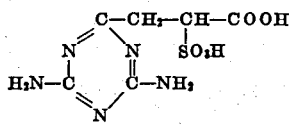

To 51 parts of diethyl sodium sulphosuccinate dissolved in 240 parts of methanol containing 4.2 parts of sodium metal was added 25 parts of biguanide. The reaction mixture was agitated in order to obtain a clear solution. In a few minutes product began to precipitate from the solution. After standing overnight the disodium salt of β-sulpho-β-carboxypropionoguanamine was removed by filtration and washed with methanol. The yield of this disodium salt was about 95% and was purified by recrystallization from 30% alcohol. The free β-sulpho-β-carboxypropionoguanamine was obtained by dissolving the disodium salt in the minimum amount of water and acidifying to a pH of about 4.0 with concentrated sulphuric acid. This product crystallized slowly when the solution was cooled in an ice-salt bath. The β-sulpho-β-carboxypropionoguanamine is very soluble in water at temperatures in excess of about 25° C., and only moderately soluble in water at about 0–5° C.

A mixed biguanide salt of β-sulpho-β-carboxypropionoguanamine can be prepared in a similar manner by omitting the sodium alkoxide and adding excess biguanide.

Example 3

ω-sulphodecanoguanamine.

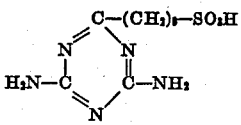

To 5 parts of biguanide in 120 parts of methanol were added 13.5 parts of butyl ω-sodium sulphodecanoate, which was prepared from ω-carbomethoxy-n-nonylpseudothiourea hydrobromide according to the method reported in J. A. C. S. 59, 1837, 2439 (1937). The reaction mixture was allowed to stand overnight and crystallization was aided by agitation. The crude sodium salt of ω-sulphodecanoguanamine was filtered and dissolved in hot water and treated with decolorizing carbon. The solution was made acid with hydrochloric acid and the free guanamine so obtained was washed with hot water and methanol. The yield of crude ω-sodium sulphodecanoguanamine was 14 parts which is a quantitative yield.

Example 4

4-N-phenyl-β-sulphopropionoguanamine

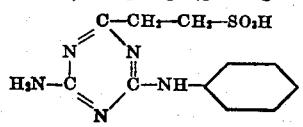

To 25 parts of methyl-β-sulphopropionate dissolved in about 250 parts of methanol containing 7.0 parts of sodium metal was added 26.5 parts of phenylbiguanide. The reaction mixture was stirred for a short time in order to aid precipitation of the guanamine. After standing about 24 hours the product was filtered from the solvent and the free 4-N-phenyl-β-sulphopropionoguanamine was obtained by acidification of an aqueous solution of the sodium salt. The product crystallized from hot water in the form of fine colorless crystals.

What I claim is:

1. A β-sulpho-β-carboxypropionoguanamine having the following formula:

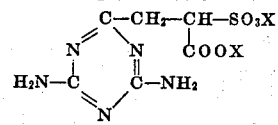

in which X is a member of the group consisting of hydrogen, salt forming, strong organic nitrogen bases and salt forming metals.

2. A ω-sulphodecanoguanamine of the following formula:

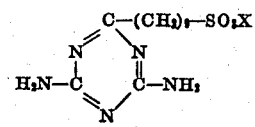

in which X is a member of the group consisting of hydrogen, salt forming, strong organic nitrogen bases and salt forming metals.

3. A method of preparing β-sulphopropionoguanamine which comprises mixing biguanide with an ester of a β-sulphopropionic acid and recovering the thus formed guanamine.

4. A method of preparing β-sulpho-β-carboxypropionoguanamine which comprises mixing biguanide with a salt of a diester of sulpho succinic acid and recovering the thus formed guanamine.

5. A method of preparing ω-sulphodecanoguanamine which comprises mixing biguanide with an ester of ω-sulphodecanoic acid and recovering the thus formed guanamine.

JACK THEO THURSTON.